US010087907B2

(12) United States Patent
Fjalling

(10) Patent No.: US 10,087,907 B2
(45) Date of Patent: Oct. 2, 2018

(54) TRANSPORTER AND FISH LOCK

(71) Applicant: Arne Fjalling, Ekero (SE)

(72) Inventor: Arne Fjalling, Ekero (SE)

( * ) Notice: Subject to any disclaimer, the term of this patent is extended or adjusted under 35 U.S.C. 154(b) by 0 days.

(21) Appl. No.: 14/912,499

(22) PCT Filed: Aug. 25, 2014

(86) PCT No.: PCT/SE2014/050963
§ 371 (c)(1),
(2) Date: Feb. 17, 2016

(87) PCT Pub. No.: WO2015/026289
PCT Pub. Date: Feb. 26, 2015

(65) Prior Publication Data
US 2016/0201283 A1    Jul. 14, 2016

(30) Foreign Application Priority Data

Aug. 23, 2013   (SE) ...................................... 1350969

(51) Int. Cl.
*E02B 8/08*    (2006.01)
*F03B 7/00*    (2006.01)
(Continued)

(52) U.S. Cl.
CPC ................ *F03B 7/00* (2013.01); *E02B 1/006* (2013.01); *E02B 8/085* (2013.01); *F03B 3/103* (2013.01);
(Continued)

(58) Field of Classification Search
CPC ........ A01K 61/00; A01K 79/00; A01K 77/00; A01K 61/54; A01K 61/59; A01K 61/60;
(Continued)

(56) References Cited

U.S. PATENT DOCUMENTS 2,908,226 A  *  10/1959  Rich ....................... B01F 7/082
                                                       418/194
3,443,565 A  *  5/1969  Jouveneaux .......... A01F 12/442
                                                       460/115
(Continued)

FOREIGN PATENT DOCUMENTS

AT              512766 A1    10/2013
DE   20 2011 10 8819 U1     1/2012
(Continued)

OTHER PUBLICATIONS

International Search Report, dated Dec. 5, 2014, from corresponding PCT application.

*Primary Examiner* — Benjamin F Fiorello
*Assistant Examiner* — Edwin J Toledo-Duran
(74) *Attorney, Agent, or Firm* — Dilworth & Barrese, LLP

(57) ABSTRACT

Transporter and fish lock including an upper inlet and an upper outlet adapted to be in flow communication with an upper volume of water, and a lower outlet and a lower inlet adapted to be in flow communication with a lower volume of water. The upper inlet and the lower outlet communicate via a downstream passage having a first effective through-flow area, and the lower inlet and the upper outlet communicate via an upstream passage having a second effective through-flow area. The downstream passage includes a first helical rotor having a thread-direction that by a flow directed downstream causes the first rotor to rotate around its axis. The upstream passage includes a second helical rotor, wherein the rotors are mutually connected such that the first rotor drives the second rotor in rotation around its axis, and the second rotor has a thread-direction that upon rotation generates a flow directed upstream.

11 Claims, 1 Drawing Sheet

(51) Int. Cl.
*E02B 1/00* (2006.01)
*F04D 3/02* (2006.01)
*F03B 3/10* (2006.01)

(52) U.S. Cl.
CPC .......... *F04D 3/02* (2013.01); *F05B 2240/243* (2013.01); *Y02E 10/223* (2013.01)

(58) Field of Classification Search
CPC ........ A01K 61/70; A01K 61/90; A01K 63/02; A01K 63/04; A01K 67/033; A01K 67/0334; A01K 69/00; A01K 73/06; A01K 80/00; A01K 97/05; B29C 47/0009; B29C 47/60; B65G 33/00; B65G 33/18; B65G 33/24; B65G 33/265; B65G 33/30; B65G 33/32; B65G 47/60; E02B 1/006; E02B 8/08; E02B 8/085; F01D 1/026; F01D 1/32; F01D 15/065; F04D 3/02; F04D 17/168
USPC ............ 119/3, 5; 43/6.5; 198/661, 666, 676; 415/71, 72, 73, 74; 405/81, 82, 83; 46/6.5
See application file for complete search history.

(56) References Cited

U.S. PATENT DOCUMENTS

| | | | | |
|---|---|---|---|---|
| 4,194,844 A | * | 3/1980 | Walling | B01F 3/18 198/548 |
| 4,217,718 A | | 8/1980 | Faivre | |
| 4,960,363 A | * | 10/1990 | Bergstein | F03B 13/264 290/53 |
| 5,377,918 A | * | 1/1995 | Garcia Pastor | D21B 1/345 241/46.17 |
| 5,593,098 A | * | 1/1997 | Spencer | D21B 1/32 241/154 |
| 5,871,081 A | * | 2/1999 | Gaalswyk | B65G 33/18 198/502.4 |
| 5,951,262 A | * | 9/1999 | Hartman | F04D 1/06 417/356 |
| 6,193,053 B1 | * | 2/2001 | Gaalswyk | B65G 33/18 198/658 |
| 2002/0059946 A1 | * | 5/2002 | Wilcher | B01D 21/2461 134/65 |
| 2004/0027020 A1 | * | 2/2004 | Newcomb | F04D 3/02 310/156.01 |
| 2008/0230491 A1 | * | 9/2008 | Wick | B03B 9/02 210/787 |
| 2011/0094199 A1 | * | 4/2011 | Farley | A01F 12/46 56/14.6 |
| 2012/0119503 A1 | * | 5/2012 | van Breems | F03B 13/14 290/55 |
| 2012/0169057 A1 | * | 7/2012 | Tonkin | F03B 17/061 290/54 |
| 2012/0285814 A1 | * | 11/2012 | Del Monte | C10B 7/10 201/32 |

FOREIGN PATENT DOCUMENTS

| | | | |
|---|---|---|---|
| DE | 202011108819 U1 * | 1/2012 | ............... F03B 3/18 |
| DE | 20 2012 10 4612 U1 | 12/2012 | |
| EP | 1 015 735 B1 | 7/2000 | |
| EP | 1 930 597 A2 | 6/2008 | |
| JP | 57088277 A | 6/1982 | |
| NL | 1029915 C2 | 3/2007 | |
| WO | 95/15079 A1 | 6/1995 | |

\* cited by examiner

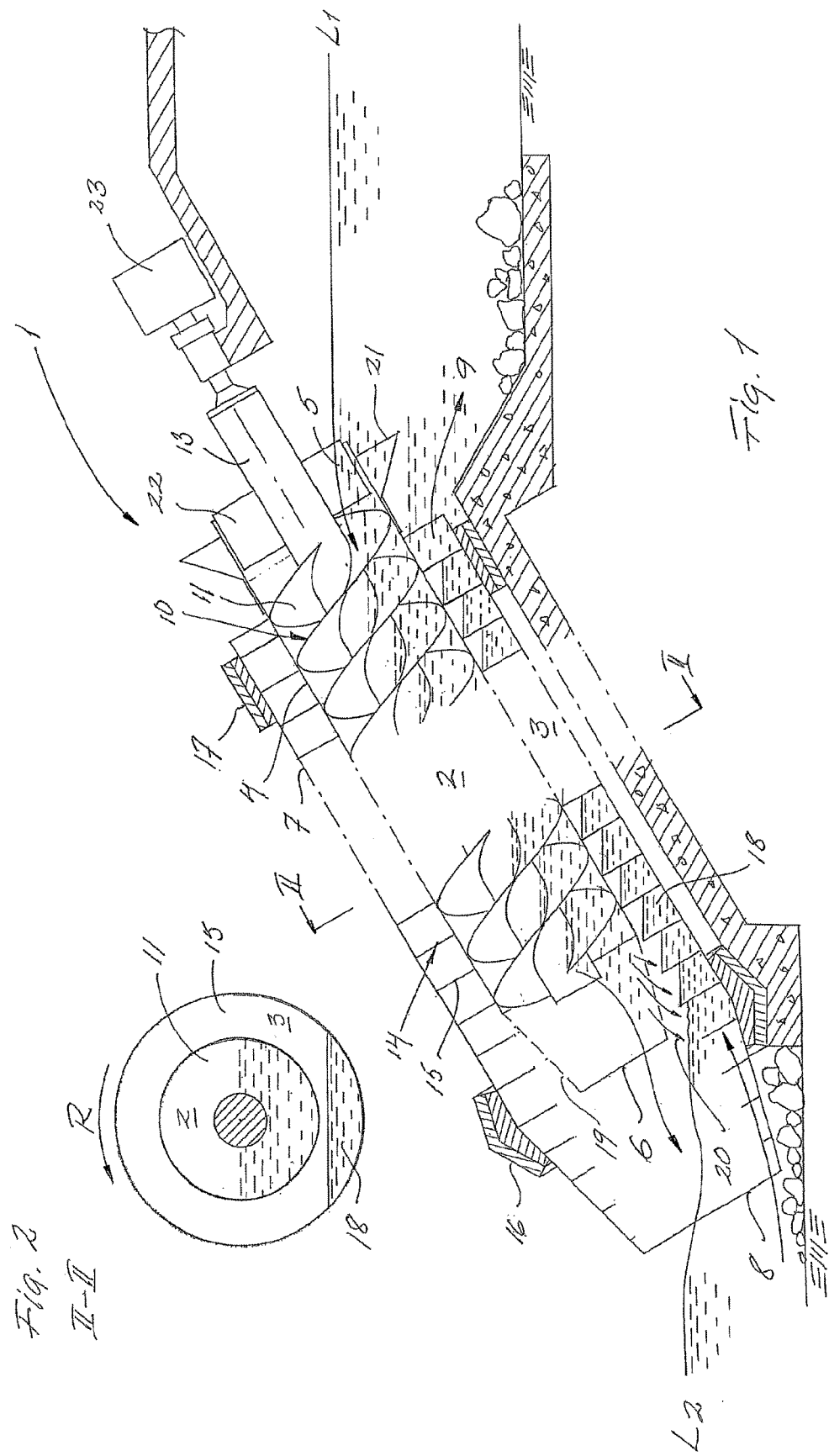

TRANSPORTER AND FISH LOCK

TECHNICAL FIELD OF THE INVENTION

The present invention relates to a transporter adapted for two-way transport of water and organisms living in water, such as fish, between a volume of water situated at a lower level and a volume of water situated at a higher level in relation to the lower level.

BACKGROUND AND PRIOR ART

An object and problem of the present invention is based on offering secure migration ways for fish and other organisms living in water past power stations, dam constructions and other water plants.

The present invention is based on using an Archimedes screw, which is driven in rotation and thereby is adapted for lifting liquid and organisms living in the liquid from the volume of water being situated lower to the volume of water being situated higher. By its function as a transporter for water, the present invention can also operate as a pump adapted for lifting water from the volume of water situated lower to the volume of water situated higher.

Archimedes screws have been used for these purposes. In the Dutch patent NL 1029915 an example is shown of using a motor-powered screw for lifting water and fish over a dam construction. Another example of a motor-powered screw in an apparatus for catching and transporting up living fish from a basin is disclosed in the U.S. Pat. No. 4,217,718. A third example of using a motor-powered screw for transporting up fish is disclosed in the international publication WO 95/15079.

Common for all these known solutions is that they are based on using a single, motor-powered screw adapted for one-way transport of water and fish.

A pumping unit in which twin Archimedes screws are used is known from the Japanese publication JP 57088277 A. In this pump an inner screw is mounted co-axially in relation to an outer screw, wherein the screws are provided with a drive means and by means of a power distribution device individually are driven in rotation for enabling regulation and adaption due to requirements of the lifting capacity of the pump.

It is also noted that it is known from the power industry to use an Archimedes screw for power production by means of providing the screw such that it is driven in rotation of a water-flow from a volume of water situated higher to a volume of water situated lower, wherein the screw is coupled to a generator for production of electricity.

BRIEF DESCRIPTION OF THE INVENTION

An object of the present invention is to effectively use interacting Archimedes screws for two-way transport of water and organisms living in water, such as fish, between a volume of water situated at a lower level and a volume of water situated at a higher level in relation to the lower level.

This object is obtained by a transporter comprising an upper inlet and an upper outlet adapted to be arranged in flow communication with the upper volume of water, and a lower outlet and a lower inlet adapted to be arranged in flow communication with the lower volume of water. The upper inlet and the lower outlet communicate via a down-stream passage having a first effective through-flow area, and the lower inlet and the upper outlet communicate via an upstream passage having a second effective through-flow area. The downstream passage comprises a first helical (operating) rotor having a thread-direction which a flow directed down-streams causes the first rotor to rotate around its axis. The upstream passage comprises a second helical (operating) rotor, wherein the rotors are mutually connected such that the first rotor drives the second rotor to rotate around its axis, and the second rotor has a thread-direction, which during said rotation generates a flow directed upstreams.

The invention may be embodied in different embodiments. Alternatively, the first and second rotor can be coupled indirectly to each other via a power transmission for rotation around separate axis of rotation, with or without a generator and a drive unit as parts of the power transmission. However, it is preferred that the first and second rotor are coupled directly and fixed to each other for co-rotation around one and the same, common axis of rotation.

According to a particular preferred embodiment, the first and second rotors are mutually coupled concentrically to each other, and the second rotor is caused to co-rotate with the rotation of the first rotor around an axis of rotation common for both rotors. It is realised that according to this embodiment, the second rotor is driven by the first rotor to rotate in the same direction of rotation as the first rotor, and hence has a thread-direction being counter-directed to the thread-direction of the first rotor.

According to a preferred embodiment, the driving first rotor is arranged centrally in a tubular inner housing, but the driven second rotor is arranged peripherally in an annular space formed between the inner housing and a further outer housing, concentrically to the inner housing. The driven second rotor thereby forms a helical (operating) wall connecting the outer and inner housings of the transporter.

The inlet to the downstream passage having the driving rotor is in this embodiment typically provided axially outside the outlet from the upstream passage. The length of the downstream passage can be regulated by means of a ring which is arranged axially movable in the end provided up-streams of the downstream passage, which ring forms an inlet that can be set according to the level of the upper volume of water to the downstream passage.

According to a preferred embodiment, also the inlet to the downstream passage can be surrounded by a radially projecting, flange, influencing the course of flow. Said flange is adapted to in stream patterns separate an incoming flow in the downstream passage from an outgoing flow from the upstream passage.

According to a preferred embodiment, the inlet of the upstream passage can extend axially past the outlet of the downstream passage. The inlet of the upstream passage is thereby conically diverging in the direction of flow upstreams, whereas the outlet of the downstream passage can be conically narrowing (tapered) in the direction of flow down-streams.

A stray-flow output from the downstream passage can be provided to be output in the vicinity of the inlet of the upstream passage, such a way that the stray-flow attracts and call climbing migratory fish to the inlet of the upstream passage.

Further details and aspects of the present invention will be apparent from the detailed description in more detail.

BRIEF DESCRIPTION OF DRAWING FIGURES

Embodiments of the present invention will be explained below with reference to the accompanying schematic drawing figures, wherein:

FIG. 1 illustrates a transporter and fish lock according to a first embodiment,

FIG. 2 illustrates a cross-section along the line II-II of the transporter in FIG. 1.

DETAILED DESCRIPTION OF PREFERRED EMBODIMENTS

In a semi cross-sectional side-view in FIG. 1, a transporter and fish lock 1 is illustrated forming a communication way between an upper volume of water, wherein a surface thereof is situated at a level L1, and in relation to that, a lower situated volume of water, the surface being situated at a level L2. The transporter 1 is adapted for two-way communication between the two volumes of water. For this reasons, the transporter 1 comprises a downstream passage 2 and an upstream passage 3. The downstream passage 2 is limited by a tubular housing 4 and extends between an inlet 5 of the downstream passage's higher situated end and an inlet 6 in the downstream passage's lower situated end. The upstream passage 3 is limited by the inner housing 4 and an outer concentrically to the inner housing arranged tubular housing 7, and thus extends annularly between an inlet 8 of the upstream passage's situated lower end and an outlet 9 of the upstream passage's higher situated end.

In the downstream passage 2 there is provided a first rotor 10 having a helical wall or blade 11 which along its outer periphery is anchored to the inside of the inner housing 4. The first rotor 10 has a central axis 13, which typically extends axially past the inlet 5 of the downstream passage 2. The first rotor 10 has such thread-direction that a flow of water through the downstream passage causes the rotor 10 to rotate around its axis of rotation, for instance in one axis of rotation R according to FIG. 2.

In the upstream passage 3, there is provided a second rotor 14 having a helical wall or blade 15, which along its outer periphery is anchored to the inside of the outer housing 7. This second rotor 14 has an inner periphery which is anchored to the outside of the inner housing 4, and the second rotor 14 thus couples the outer and inner housings, as well as the two rotors together forming a co-rotating unit. This unit, i.e. the transporter or fish lock 1, is rotatably mounted in the stage between the upper and lower volumes of water and in particular in the rotational bearings 16 and 17 dimensioned for this purpose.

It is realized that the first rotor 10 is the driving rotor causing the second and driven rotor 14 to rotate in the same direction of rotation as the first rotor 10. Nevertheless, the second rotor 14 has a thread-direction opposite the thread-direction of the first rotor, why the second rotor 14 at said rotation generates a flow directed up-streams in the upstream passage 3.

Between consecutive windings of the blade 15 of the helical rotor 14, there are provided, in the annular space between the inner and outer housings, discrete volumes of water or basins 18, which successively are lifted to the outlet 9 and drained in the upper situated volume of water.

To attract migratory fish and other organisms living in water to migrate into these basins 18 several co-operating measures have been taken in the example illustrated in FIGS. 1 and 2. One of these measures comprises that the inlet part 8 of the upstream passage extends past the outlet 6 of the downstream passage, and opens diverging in the upstream direction of flow. In this way an inlet close to the ground of the up-stream passage 3 is created. Another measure comprises that the outlet part of the downstream passage extends conically narrowing (tapered) in the down-stream direction of flow. In this way, space is created for via openings 19 in the tapered lower end of the inner housing create a stray flow 20 attracting the migrating fish to the basins 18 in the inlet part of the upstream passage.

An attracting flow can alternatively or in combination be created by means of the rotor in the upstream passage, in the area of the inlet of the upstream passage, is provided with over-stream openings through which water can leak down-streams from the flow directed up-streams (not illustrated in the drawing figures).

A third measure provided for supporting the migration of fish into the basins 18 is that the height of the helical blade 15 is adapted to increase gradually, seen in radial direction, from the outlet of the outer housing 7 until the blade meets and couples to the outside of the inner housing 4. In this way fish being attracted to the fish lock will in a mild way be driven into the initially relatively open basins 18, by means of a blade rising from below, to finally be trapped by a closed, limited volume of water between the inner and outer housings of the transporter.

The migration of the fish into and out of the upstream passage, or in other words into and out of the helical rotor 14, is also supported if both inlet 8 and outlet 9 are situated at deeper water-depth than corresponding inlet and outlet of the downstream passage. This is because the outer housing 7 and the upstream passage extend axially past the inner housing 4 and the downstream passage in the lower end of the transporter, i.e. in the lower situated volume of water. Said water-depth is also to some extent the cause of the inner housing 4 and the downstream passage extending axially past the outer housing 7 and the upstream passage of the upper end of the transporter, in the higher situated volume of water.

To, according to stream patterns, separate ingoing and outgoing flows in the upper end of the transporter, a radially extending flange 21 can be provided to surround the inlet of the downstream passage.

Furthermore, as illustrated in the embodiment, a ring 22 can be movable arranged in the upper end of the inner housing 4, wherein the transporter when required can be set to varying levels L1, and if requested be set with regard to regulation of the inflow to and the flow through the downstream passage.

It is realized that the dimensions of the transporter 1 typically are adapted to each application in such a way that the energy in the downstream flow matches the work required for lifting the upstream flow as well as inevitable losses related to the rotation and mounting of the transporter.

Therefore, typically, the downstream passage has a flow and effective through-flow area being larger than the flow and the effective through-flow area of the upstream passage. Herein, an effective through-flow area is related to the actual average cross-sectional area of the flow through each passage, respectively, such as schematically illustrated in FIG. 2.

Some basic guidelines for dimensioning a transporter/fish lock 1 according to FIGS. 1 and 2 can therefore not be given. However, it is assumed that in a transporter adapted for climbing salmon and sea trout, for instance, basins can 18 be required containing say 500-1000 liters of water. For such volumes of water, the outer housing 7 can require a radius within the range of at least 1.5-2.5 meters. The inclination of the transporter, the helix angle and the number of threads per length of the helical rotors affect other dimensions and the flows in such a way that every case must be treated separately.

If there is water, height of delivery and angle of delivery etc. enough, energy in excess can be recovered by means of the first and driving rotor 10 being coupled operatively to a rotating machine 23, such as a generator 23, in such a way that is indicated schematically in FIG. 1. This solution can be preferred in particular in applications wherein the upstream passage can be closed during seasons when no climbing of fish is to be expected.

Furthermore, migration of fish down-streams can occur without risk since the rotor 10 being driven does not rotate faster than the velocity of flow of water and hence cannot harm fish following the water through the downstream passage. Furthermore, the fish is spared from the fast pressure changes it is normally subject to when passing the blade wheel in a conventional turbine.

The two-way transporter according to the present invention, according to one of its primary applications also is denoted fish lock, has been illustrated in the form of a rotating machine, which without supply of external energy is driven by a flow directed down-streams for generating a flow in return to the same body of water, such as a water course, or between discrete volumes of water such as in a terrace plantation or the like. It is realized outgoing from the description of the present invention as given in the application that departure from the embodiments illustrated can be given, without departing from the scope of the invention, such as this is defined in the accompanying sub-claims.

The invention claimed is:

1. A transporter, provided for two-way transport of water or water with fish living in water, between an upper volume of water situated at a higher level and a lower volume of water situated at a lower level in relation to the higher level, which transporter comprises:

a downstream passage, the downstream passage comprising a first tubular housing extending between i) a first inlet located to accept water or water with fish from the upper volume of water, and ii) a first outlet located to discharge the water or the water with fish to the lower volume of water, the first tubular housing being an inner housing;

an upstream passage comprising a second tubular housing located around the first tubular housing such that the upstream passage is located around the downstream passage with the upstream passage being concentric to the downstream passage, the second tubular housing being an outer housing, a cross section of the upstream passage extending from the inner, first tubular housing to the outer, second tubular housing, a diameter of the second tubular housing being greater than a diameter of the first tubular housing, the upstream passage comprising i) a second inlet located to accept water or water with fish from the lower volume of water and ii) a second outlet located to discharge the water or the water with fish to the upper volume of water;

wherein the downstream passage has a first effective through-flow area, and the upstream passage has a second effective through-flow area, and a first rotor located in the downstream passage, the first rotor being a first helical rotor having a first axis and a first thread-direction, which by a flow of the water or the water with fish i) received in the first inlet from the upper volume of water, and ii) discharged at the first outlet to the lower volume of water, causes the first rotor to rotate around the first axis, and a second rotor located in the upstream passage and having a second axis, the second rotor being a second helical rotor operatively connected to the first rotor such the first rotor is a driving rotor and the second rotor is a driven rotor where the first rotor drives the second rotor in rotation in a first direction around the second axis, wherein the second rotor has a second thread-direction opposite the first thread-direction which with said rotation in the first direction generates a water flow taking the water or water with fish accepted at the second inlet located at the lower volume of water upward to be discharged at the second outlet located at the upper volume of water, wherein the first and the second rotors are mutually coupled concentrically to each other, wherein the first and second axes are co-located and provide a common axis of rotation for the first and second rotors, wherein the first rotor is arranged centrally in the inner, first tubular housing, and the second rotor is arranged peripherally in an annular space between the inner, first tubular housing and the outer, second tubular housing, concentrically to the inner, first tubular housing, wherein the second rotor being driven forms a helical wall connecting the outer, second tubular housing and the inner, first tubular housing.

2. The transporter according to claim 1, wherein the first inlet of the downstream passage is situated axially outside the second outlet of the upstream passage.

3. The transporter according to claim 1, wherein the second inlet of the upstream passage is situated axially outside the first outlet of the downstream passage.

4. The transporter according to claim 3, wherein the second inlet of the upstream passage is conically diverging in the direction of flow.

5. The transporter according to claim 4, wherein the first outlet of the downstream passage is conically narrowing, tapered, in the direction of flow.

6. The transporter according to claim 5, wherein a stray-flow output from the downstream passage is provided to be discharged in the vicinity of the second inlet of the upstream passage.

7. A transporter, provided for two-way transport of water or water with fish living in water, between an upper volume of water situated at a higher level and a lower volume of water situated at a lower level in relation to the higher level, which transporter comprises:

a downstream passage, the downstream passage comprising a first tubular housing extending between i) a first inlet located to accept water or water with fish from the upper volume of water, and ii) a first outlet located to discharge the water or water with fish to the lower volume of water, the first tubular housing being an inner housing;

an upstream passage comprising a second tubular housing located around the first tubular housing such that the upstream passage is located around the downstream passage with the upstream passage being concentric to the downstream passage, the second tubular housing being an outer housing, a cross section of the upstream passage extending from the inner, first tubular housing to the outer, second tubular housing, a diameter of the second tubular housing being greater than a diameter of the first tubular housing, the upstream passage comprising i) a second inlet located to accept water or water with fish from the lower volume of water and ii) a second outlet located to discharge the water or water with fish to the upper volume of water;

wherein the downstream passage has a first effective through-flow area, and the upstream passage has a second effective through-flow area, and a first rotor located in the downstream passage, the first rotor being a first helical rotor having a first axis and a first thread-direction, which by a flow of the water or water with fish i) received in the first inlet from the upper volume of water, and ii) discharged at the first outlet to the lower volume of water, causes the first rotor to rotate around the first axis, and a second rotor located in the upstream passage and having a second axis, the second rotor being a second helical rotor operatively connected to the first rotor such the first rotor is a driving rotor and the second rotor is a driven rotor where the first rotor drives the second rotor in rotation in a first direction around the second axis, wherein the second rotor has a second thread-direction opposite the first thread-direction which with said rotation in the first direction generates a water flow taking the water or water with fish accepted at the second inlet located at the lower volume of water upward to be discharged at the second outlet located at the upper volume of water, wherein the first and the second rotors are mutually coupled concentrically to each other, wherein the first and second axes are co-located and provide a common axis of rotation for the first and second rotors, wherein the first rotor is arranged centrally in the inner, first tubular housing, and the second rotor is arranged peripherally in an annular space between the inner, first tubular housing and the outer, second tubular housing, concentrically to the inner, first tubular housing, wherein the second rotor being driven forms a helical wall connecting the outer, second tubular housing and the inner, first tubular housing; and a radial ring which regulates a length of the downstream passage, the ring being movably arranged in an upper inlet end of the downstream passage, which ring forms the first inlet of the downstream passage, the ring being axially movable in the upper end of the inner housing to set a length of the first inlet to correspond to a level of the upper volume of water.

8. The transporter according to claim 1, wherein the first inlet of the downstream passage is surrounded by a radially extending flange influencing stream patterns.

9. The transporter according to claim 8, wherein said flange according to stream-patterns separates an incoming flow to the downstream passage from an outgoing flow from the upstream passage.

10. The transporter according to claim 1, wherein the driving first rotor is operatively connected to a rotating machine.

11. A transporter (1) for two-way transport of water or water with fish, between an upper volume of water situated at a higher level and a lower volume of water situated at a lower level in relation to the higher level, said transporter comprising:

cylindrically-shaped outer and inner housing defining inner and outer concentric passages and having an upper inlet and an upper outlet of said respective inner and outer concentric passages and configured to be in flow communication with the upper level of water, an axle centrally mounted within both said outer and inner housing, a lower outlet and a lower inlet of said respective inner and outer concentric passages and configured to be in flow communication with the lower level of water, a first helical rotor situated within said inner concentric passage and mounted upon said axle to have a discrete thread orientation such that a downstream flow of water or water with fish through said inner concentric passage causes the first rotor to rotate around said axle, a second helical rotor situated within said outer concentric passage, mounted upon said centrally-positioned axle through said inner housing and first helical rotor and having a thread orientation opposite the thread orientation of said first rotor, said second helical rotor comprising blades anchored to both said inner and outer housing and said first helical rotor comprising blades anchored to said inner housing, such that said transporter rotates as a unit with the downstream flow of water or water with fish through said inner concentric passage directing an upstream flow or water or water with fish through said outer concentric passage, the lower inlet of said outer concentric passage extends beyond and encompasses the lower outlet of said inner concentric passage, and helical blades are positioned along an inner surface of said outer housing beyond said lower outlet of said inner concentric passage.

* * * * *